(12) United States Patent
Al-Husseiny et al.

(10) Patent No.: US 11,094,177 B2
(45) Date of Patent: Aug. 17, 2021

(54) HAPTIC GARMENT AND METHOD THEREOF

(71) Applicant: Telefonaktiebolaget LM Ericsson (publ), Stockholm (SE)

(72) Inventors: Zeid Al-Husseiny, Stockholm (SE); José Araújo, Stockholm (SE); Soma Tayamon, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/640,873

(22) PCT Filed: Sep. 5, 2017

(86) PCT No.: PCT/EP2017/072212
§ 371 (c)(1),
(2) Date: Feb. 21, 2020

(87) PCT Pub. No.: WO2019/048023
PCT Pub. Date: Mar. 14, 2019

(65) Prior Publication Data
US 2020/0357249 A1    Nov. 12, 2020

(51) Int. Cl.
*G08B 6/00* (2006.01)
*A41D 1/00* (2018.01)

(52) U.S. Cl.
CPC .............. *G08B 6/00* (2013.01); *A41D 1/002* (2013.01)

(58) Field of Classification Search
None
See application file for complete search history.

(56) References Cited

U.S. PATENT DOCUMENTS

| | | |
|---|---|---|
| 9,402,582 B1 | 8/2016 | Parviz et al. |
| 10,678,334 B1 * | 6/2020 | Pezent .................. G06F 3/013 |
| 2002/0191011 A1 | 12/2002 | Rasouli |

(Continued)

OTHER PUBLICATIONS

International Search Report and the Written Opinion of the International Searching Authority, issued in corresponding International Application No. PCT/EP2017/072212, dated Nov. 2, 2017, 14 pages.

(Continued)

*Primary Examiner* — Carlos Garcia
(74) *Attorney, Agent, or Firm* — Rothwell, Figg, Ernst & Manbeck, P.C.

(57) ABSTRACT

A haptic garment, such as a haptic glove, is provided. The haptic glove is operative to measure haptic properties of a skin of a user wearing the haptic glove, using haptic sensors, to transmit a representation of the measured haptic properties to another haptic garment, e.g., another haptic glove worn by another user, to receive a representation of measured haptic properties of a skin of the other user from the other haptic glove, and, in response to detecting contact between the haptic glove and the other haptic glove, to render the received representation of the haptic properties of the skin of the other user within an area of contact between the haptic glove and the other haptic glove using haptic actuators. The representations of measured haptic properties are exchanged via communications modules comprised in the haptic gloves.

23 Claims, 6 Drawing Sheets

(56) References Cited

U.S. PATENT DOCUMENTS

| | | | |
|---|---|---|---|
| 2014/0085077 A1* | 3/2014 | Luna | A61B 5/7455 340/539.11 |
| 2014/0318699 A1* | 10/2014 | Longinotti-Buitoni | A41D 1/002 156/247 |
| 2015/0250420 A1* | 9/2015 | Longinotti-Buitoni | A61B 5/1135 600/301 |
| 2016/0054797 A1 | 2/2016 | Tokubo et al. | |
| 2016/0259408 A1 | 9/2016 | Messingher et al. | |
| 2016/0342207 A1 | 11/2016 | Beran | |
| 2017/0031449 A1* | 2/2017 | Karsten | G16H 50/20 |
| 2019/0132948 A1* | 5/2019 | Longinotti-Buitoni | A61B 5/0022 |

OTHER PUBLICATIONS

Gloveone, http://www.neurodigital.es/gloveone/ retrieved on Sep. 5, 2017, 2 pages.

Avatar VR, http://www.neurodigital.es/avatarvr/ retrieved on Sep. 5, 2017, 3 pages.

* cited by examiner

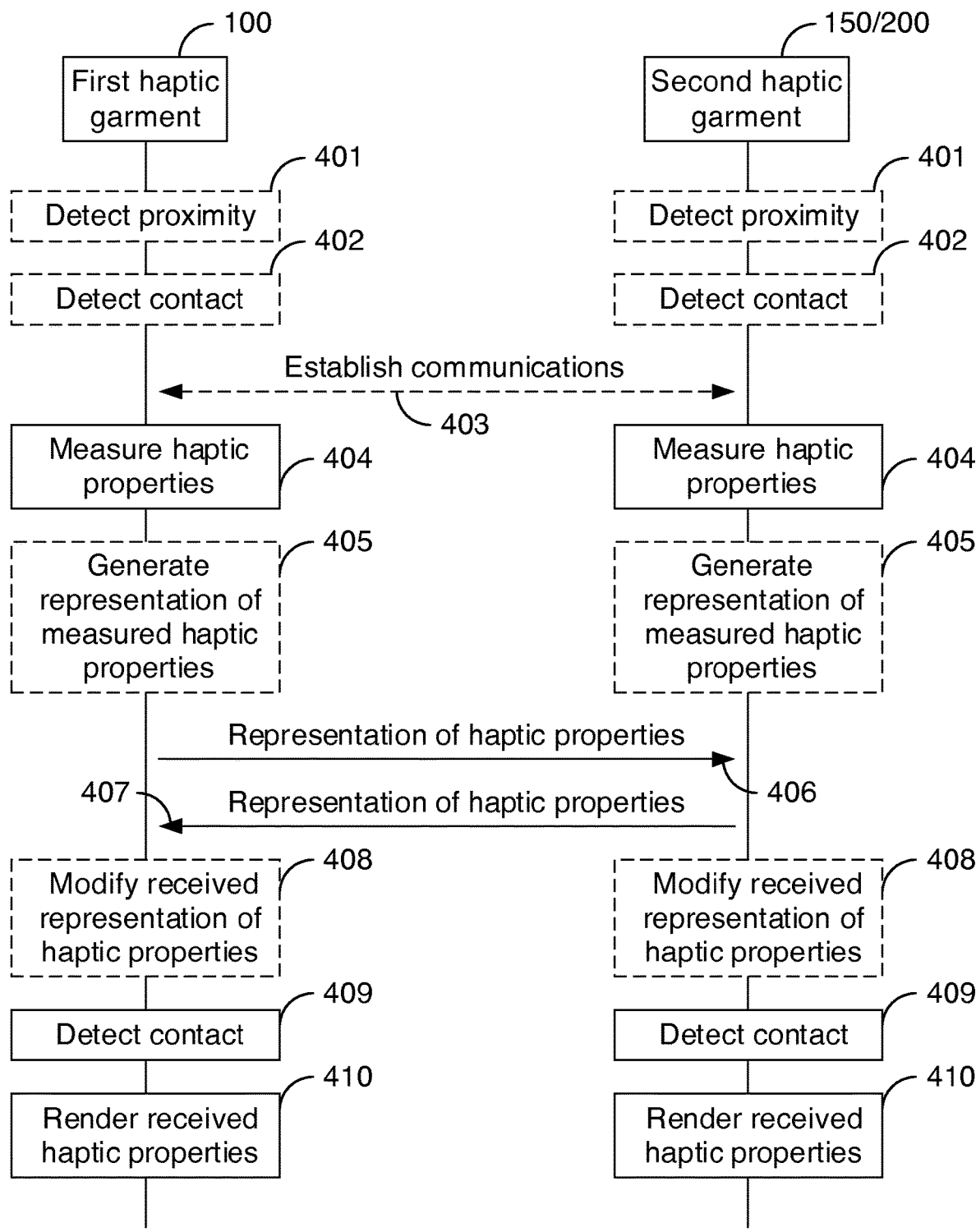

HAPTIC GARMENT AND METHOD THEREOF

CROSS REFERENCE TO RELATED APPLICATION(S)

This application is a 35 U.S.C. § 371 National Phase Entry Application from PCT/EP2017/072212, filed Sep. 5, 2017, designating the United States, the disclosure of which is incorporated herein in its entirety by reference.

TECHNICAL FIELD

The invention relates to a haptic garment, a method performed by a haptic garment, a corresponding computer program, and a corresponding computer program product.

BACKGROUND

Devices with haptic interfaces are seen as the next step in mobile networking. Users are currently able to efficiently communicate using voice and video, but it is envisioned that people in the future networked society will also communicate through the sense of touch, using haptic devices.

Haptic perception consists of kinesthetic and tactile sense, and relates to the sensation of the size, shape, mass, texture, and stiffness, of physical objects, surfaces, etc. Kinesthetic sense refers to the information perceived by a person when moving joints, muscles, and tendons, while tactile sense refers to information retrieved via a person's skin.

In recent years, besides haptic smartphones and smartwatches, haptic garments, i.e., pieces of clothing such as gloves, vests, bodysuits, and the like, have been developed. Haptic garments enable immersive haptic experience, e.g., in Virtual Reality (VR) systems.

Haptic information, which is used to render a haptic sensation to a person using a haptic device, e.g., wearing a haptic garment, may be received from a remote source. The remote source may be another haptic device used by the same or another user, or a database/server providing haptic content, e.g., as part of an Augmented Reality (AR)/VR environment. The received haptic information is rendered using haptic actuators. For instance, two users wearing haptic gloves which are exchanging haptic information over a communications channel, e.g., the Internet, may shake hands remotely. To this end, each user experiences the haptic sensation as if touching the hand of the other user, without being in physical contact and as if no gloves were present.

U.S. Pat. No. 9,402,582 B1 discloses a surgical glove which includes sensors configured to detect one or more properties of a tissue and indicators, e.g., haptic elements or heat-emitting elements, configured to provide a sensation to a wearer of the surgical glove which is related to the detected one or more properties of the tissue. In particular, this may enable a sensation of touch which the wearer would experience as if he or she would not be wearing a glove.

SUMMARY

It is an object of the invention to provide an improved alternative to the above techniques and prior art.

More specifically, it is an object of the invention to provide improved haptic garments, i.e., items of clothing which are provided with haptic sensors and/or actuators, such as haptic gloves, haptic vests, haptic jackets, or haptic pants. In particular, it is an object of the invention to provide haptic garments which provide an improved haptic sensation to a wearer of a haptic garment which is in physical contact with another wearer of a haptic garment.

These and other objects of the invention are achieved by means of different aspects of the invention, as defined by the independent claims. Embodiments of the invention are characterized by the dependent claims.

According to a first aspect of the invention, a haptic garment is provided. The haptic garment is configured to cover at least part of a body part of a user, i.e., a person wearing the haptic garment, herein also referred to as wearer or user. The haptic garment comprises at least one haptic sensor configured to measure one or more haptic properties of a skin of the user. The haptic garment further comprises at least one haptic actuator configured to render one or more haptic properties for sensing by the skin of the user. The haptic garment further comprises at least one contact sensor configured to detect contact between the haptic garment and another haptic garment, the other haptic garment covering at least part of a body part of another user. The haptic garment further comprises a communications module configured to exchange information about one or more haptic properties between the haptic garment and the other haptic garment. The haptic garment is operative to measure the one or more haptic properties of a skin of the user using the at least one haptic sensor, and to transmit a representation of the one or more measured haptic properties of the skin of the user to the other haptic garment via the communications module. The haptic garment is further operative to receive a representation of one or more haptic properties of a skin of the other user from the other haptic garment via the communications module, and to render the received representation of the one or more haptic properties of the skin of the other user within an area of contact between the haptic garment and the other haptic garment using the at least one haptic actuator. The received representation of the one or more haptic properties of the skin of the other user is rendered in response to detecting contact between the haptic garment and the other haptic garment by the at least one contact sensor.

According to a second aspect of the invention, a method performed by a haptic garment is provided. The haptic garment covers at least part of a body part of a user. The method comprises measuring one or more haptic properties of a skin of the user, and transmitting a representation of the one or more measured haptic properties of the skin of the user to another haptic garment, the other haptic garment covering at least part of a body part of another user. The one or more haptic properties of the skin of the user are measured using at least one haptic sensor comprised in the haptic garment. The representation of the one or more measured haptic properties of the skin of the user is transmitted via a communications module comprised in the haptic garment. The method further comprises receiving a representation of one or more haptic properties of a skin of the other user from the other haptic garment, and rendering the received representation of the one or more haptic properties of the skin of the other user within an area of contact between the haptic garment and the other haptic garment using at least one haptic actuator comprised in the haptic garment. The representation of one or more haptic properties of the skin of the other user is received via the communications module. The received representation of the one or more haptic properties of the skin of the other user is rendered in response to detecting contact between the haptic garment and the other haptic garment by at least one contact sensor comprised in the haptic garment.

According to a third aspect of the invention, a computer program is provided. The computer program comprises computer-executable instructions for causing a haptic garment to perform the method according to an embodiment of the second aspect of the invention, when the computer-executable instructions are executed on a processing unit comprised in the haptic garment.

According to a fourth aspect of the invention, a computer program product is provided. The computer program product comprises a computer-readable storage medium which has the computer program according to the third aspect of the invention embodied therein.

The invention makes use of an understanding that haptic sensation experienced by two users wearing haptic garments, which users are in physical contact with each other, can be improved by exchanging information pertaining to one or more measured haptic properties of the skin of one of the users to the other haptic garment worn by the other user for rendering. The representation of the one or more haptic properties which is received by one of the haptic garments is rendered in response to detecting contact with the other haptic garment, and the haptic properties are rendered within an area of contact with the other haptic garment. Thereby, a haptic sensation is achieved which is perceived by the users wearing the haptic garments as if their body parts were in direct physical contact with each other, i.e., touching each other, with no haptic garments present. In other words, each of the users feels the skin of the other user, and vice versa, rather than an outer surface of the haptic garment which the other user is wearing.

Advantageously, embodiments of the invention enable a more personal interaction between users of haptic garments without requiring the users to remove their haptic garments. For instance, two users of haptic gloves may shake hands without removing their haptic gloves from their hands, and may still experience the sensation of touching the other user's hand as if they were not wearing gloves.

In the present context, haptic properties include, but are not limited to size, weight, contour, surface characteristics, material characteristics, consistency, and temperature. Surface and material characteristics may, e.g., include texture and roughness.

It will be appreciated that embodiments of the invention may be envisaged, which only measure haptic properties of the skin of the user and transmit information pertaining to the measured haptic properties to the other haptic garment where they are received and rendered. Correspondingly, embodiments of the invention may be envisaged, which only receive information pertaining to haptic properties of the skin of the other user from the other haptic garment and render the received representation in response to detecting contact. That is, rather than providing a bidirectional exchange of haptic information between two haptic garments which are in contact, these embodiments provide a unidirectional transfer of measured haptic properties of a skin of a user for rendering by a haptic garment worn by another user.

According to an embodiment of the invention, the representation of the one or more haptic properties of the skin of the user is generated by the haptic garment before transmission to the other haptic garment. The generated representation may represent at least one of the one or more haptic properties of the skin of the user as an average value over at least part of the skin of the user. For instance, rather than transmitting information about a measured haptic property at the measured spatial resolution, a value which is averaged over a certain surface of the body part of the user may be transmitted, thereby reducing the amount of data which needs to be transmitted over a potentially wireless connection. Additionally, or alternatively, the generated representation may represent at least one of the one or more haptic properties of the skin of the user as limited to one or more pre-determined haptic properties, and/or limited to one or more pre-determined ranges. The pre-determined haptic properties and/or pre-determined ranges may, e.g., be configured by a user wearing the haptic garment, by a provider of a haptic software application or app, or by a provider of a haptic service. For instance, for privacy reasons the user of a haptic garment may select to only share certain haptic properties with other users of haptic garments, or limit the resolution and/or range of measured values so as to not reveal scars or the like.

According to another embodiment of the invention, the received representation of the one or more haptic properties of the skin of the other user may be modified by the haptic garment before rendering. In correspondence with the embodiment described hereinbefore, the modified representation of the one or more haptic properties of the skin of the other user represents at least one of the one or more haptic properties of the skin of the other user as an average value over at least part of the skin of the other user. Additionally, or alternatively, the modified representation of the one or more haptic properties of the skin of the other user may represent at least one of the one or more haptic properties of the skin of the user as limited to one or more pre-determined haptic properties, and/or limited to one or more pre-determined ranges. For instance, the user of a haptic garment may feel uncomfortable with feeling certain haptic properties of other users of haptic garments.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 4 shows a signaling diagram, illustrating embodiments of the invention.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
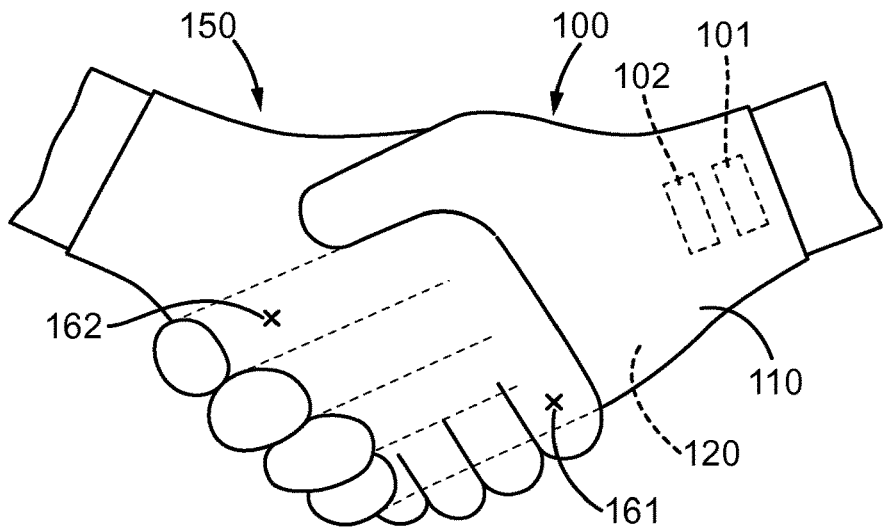
FIG. 1 illustrates two haptic gloves, in accordance with embodiments of the invention.

In FIG. 1, an embodiment of the haptic garment is illustrated as a haptic glove 100 worn by a user, also referred to as wearer, i.e., a person. Haptic glove 100 is illustrated as being in physical contact with, i.e., touching, another haptic glove 150 worn by another user. Haptic glove 150 is similar to haptic glove 100. For instance, the user of haptic glove 100 and the other user, wearing haptic glove 150, may be shaking hands, resulting in one or more contact areas 520 (exemplified in FIG. 5) between the outer surfaces 110 of haptic gloves 100 and 150. Typically, these contact areas are located within the palms and at the fingers of the hands.

Haptic glove 100 comprises at least one haptic sensor configured to measure one or more haptic properties of a skin of the user. Preferably, the at least one haptic sensor is located so as to face the skin of the user, e.g., on or within an inner surface 120 of haptic glove 100. The at least one haptic sensor is shown in FIG. 3A, which shows a part of a haptic garment 300, e.g., a patch of a haptic fabric, which is comprised in haptic gloves 100 and 150.

Figure 3A:
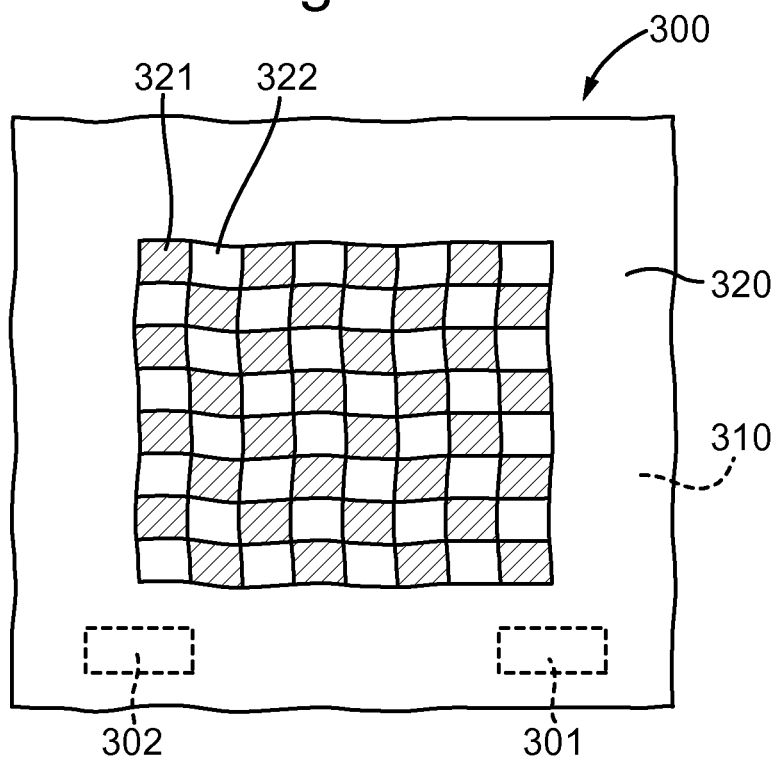
FIGS. 3A and 3B show a part of a haptic garment, in accordance with embodiments of the invention.

In FIG. 3A, the at least one haptic sensor 321, which is located on or within the inner surface 320 of haptic garment 300, is illustrated as a plurality of haptic sensors arranged in rows and columns, i.e., in a matrix-style arrangement. Haptic sensors 321 may, e.g., be a plurality of separate haptic sensors, wherein each sensor is configured to measure one or more haptic properties within an area of the user's skin which is covered by the sensor. Alternatively, haptic sensor 321 may be provided as a single unit which is configured to measure the one or more haptic properties within the area covered by the sensor with a certain spatial resolution. Throughout this disclosure, the terms "haptic sensor" and "haptic sensors" are used synonymously with reference to 321.

Haptic sensors 321 may cover the entire inner surface 120 of haptic glove 100 or only parts thereof. For instance, one may envisage embodiments of haptic glove 100 which is provided with haptic sensors 321 only within regions where the wearer's palm and fingers are located.

The one or more haptic properties of the skin of the user wearing haptic glove 100 include, but are not limited to any one or a combination of a temperature of the user's hand, a skin texture of the user's hand, a shape of the user's hand, a pressure exerted by the user's hand, and a stiffness of the user's hand. Haptic sensors are known in the art and may, e.g., be based on motion sensors (such as Inertial Measurement Units), force sensors, flex sensors, vision sensors (which can infer texture and motion), temperature sensors, pressure sensors, fingerprint sensor (to determine that a touching object is skin, and/or skin patterns), and so forth.

Figure 3B:
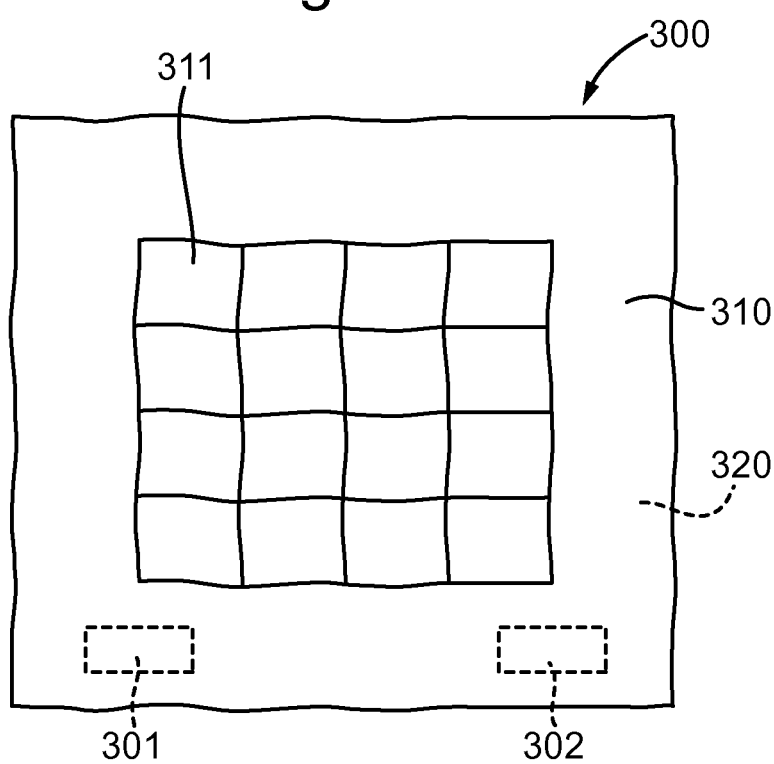

Haptic glove 100 further comprises at least one haptic actuator configured to render one or more haptic properties for sensing by the skin of the user. Preferably, the at least one haptic actuator is located so as to face the skin of the user, e.g., on or within an inner surface 120 of haptic glove 100, similar to haptic sensor 321. The at least one haptic actuator 322 is shown in FIG. 3B, which shows haptic garment 300 in an alternative view, as being located on or within inner surface 320 of haptic garment 300, and is illustrated as a plurality of haptic actuators arranged in rows and columns, i.e., in a matrix-style arrangement, interlaced with haptic sensor 321. Haptic actuators 322 may, e.g., be a plurality of separate haptic actuators, wherein each actuator is configured to render the one or more haptic properties within an area of the user's skin which is covered by the actuator. Alternatively, haptic actuator 322 may be provided as a single unit which is configured to render the one or more haptic properties within the area covered by the actuator with a certain spatial resolution. Throughout this disclosure, the terms "haptic actuator" and "haptic actuators" are used synonymously with reference to 322.

Haptic actuators 322 may cover the entire inner surface 120 of haptic glove 100 or only parts thereof. For instance, one may envisage embodiments of haptic glove 100 which is provided with haptic actuators 322 only within regions where the wearer's palm and fingers are located, or within regions where the wearer's skin is most sensitive.

The one or more haptic properties which are rendered to the skin of the user wearing haptic glove 100 include, but are not limited to any one or a combination of a temperature of the other user's hand, a skin texture of the other user's hand, a shape of the other user's hand, a pressure exerted by the other user's hand, and a stiffness of the other user's hand. Haptic actuators are known in the art and may, e.g., be based on ultrasonic transducers, vibration motors (such as eccentric rotating mass motors and linear resonant actuators), electrostatic actuators, piezoelectric actuators, magnetic actuators, rotary motors, and flexible actuated materials (such as elastometers, and shape memory alloy actuators).

It will also be appreciated that haptic sensors 321 and haptic actuators 322 may be arranged in a different fashion than what is illustrated in FIG. 3. For instance, haptic sensors 321 and haptic actuators 322 may be arranged on top of each other, rather than being interlaced, and may provide the same or different spatial resolutions.

Further with reference to FIG. 1, haptic glove 100 further comprises at least one contact sensor configured to detect contact between haptic glove 100 and another haptic garment, i.e., a contact between their respective outer surfaces 110/310, covering at least part of a body part of another user, such as haptic glove 150. Preferably, the at least one contact sensor is located so as to face objects which come into contact with haptic glove 100, e.g., on or within an outer surface 110 of haptic glove 100. The at least one contact sensor is shown in FIG. 3B as being located on or within the outer surface 310 of haptic garment 300, and is illustrated as a plurality of contact sensors arranged in rows and columns, i.e., in a matrix-style arrangement similar to haptic sensors 321 and haptic actuators 322. Contact sensors 311 may, e.g., be a plurality of distinct contact sensors, wherein each sensor is configured to detect contact within an area of haptic glove 100 or haptic garment 300 which is covered by the sensor. Alternatively, contact sensor 311 may be provided as a single unit which is configured to detect contact within the area covered by the sensor with a certain spatial resolution. Throughout this disclosure, the terms "contact sensor" and "contact sensors" are used synonymously with reference to 311.

Contact sensors 311 may, e.g., be based on capacitive technology, proximity sensors such as ultrasound and infrared technology, and hall effect sensors.

Haptic glove 100 further comprises a communications module 101, also illustrated in FIGS. 3A and 3B as communications module 301 comprised in haptic garment 300, configured to exchange information about one or more haptic properties between haptic glove 100 and a corresponding communications module comprised in haptic glove 150, or any other haptic garment. Communications module 101/301 may be any type of electronic circuitry, optionally in combination with software, configured to effect communications, i.e., exchange of data, with a corresponding communications module in another haptic garment. Such communications may either be effected over a wired medium or a wireless medium, either directly between two haptic garments or via one or more communications networks, such as a Local Area Network (LAN) or the Internet. For example, communications module 101/301 may be based on Ethernet, Universal Serial Bus (USB), Lightning, FireWire, a short-range radio technology like Bluetooth, Near-Field Communication (NFC), Zigbee, a cellular radio technology like Global System for Mobile communications (GSM), Universal Mobile Telecommunications System (UMTS), Long Term Evolution (LTE), or a 5G technology based on NR/NX.

Figure 6:
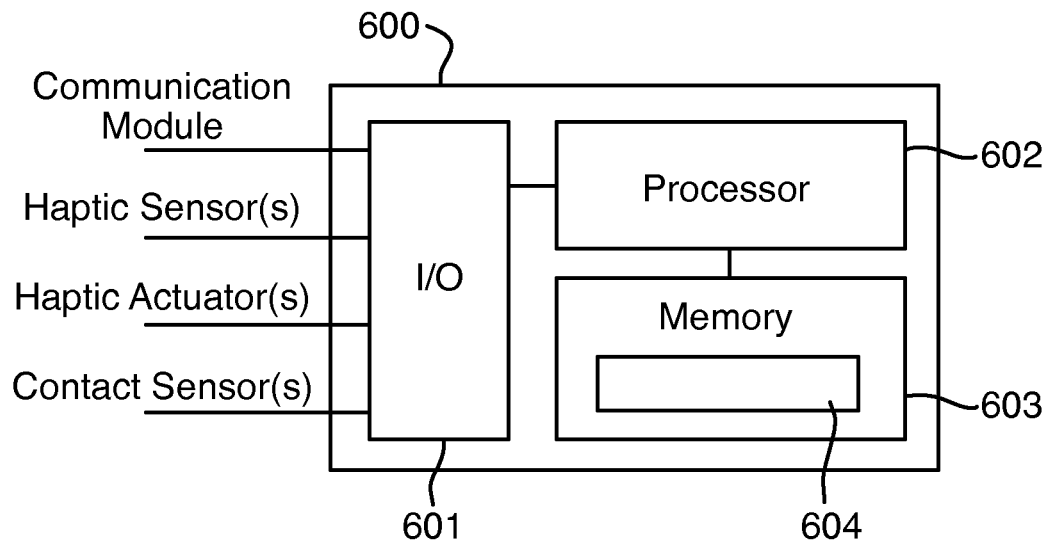
FIG. 6 shows embodiments of the processing means comprised in the haptic garment.

Haptic glove 100 further comprises a processing means 102, corresponding to processing means 302 shown in FIG. 3, which is operative to cause haptic glove 100 to perform in accordance with embodiments of the invention set forth herein, and is described in further detail with reference to FIGS. 6 and 7. Reference is also made to FIG. 4, which shows a signaling diagram illustrating the interaction between two haptic garments, such as haptic gloves 100 and 150, in accordance with embodiments of the invention.

Further with reference to FIG. 4, haptic glove 100 ("First haptic garment" in FIG. 4) is operative to measure 404 the one or more haptic properties of a skin of the user, and to transmit 406 a representation of the one or more measured haptic properties of the skin of the user to the other haptic garment ("Second haptic garment" in FIG. 4), e.g., haptic glove 150, via communications module 101/301.

Haptic glove 100 is further operative to receive 407 a representation of one or more haptic properties of a skin of the other user from haptic glove 150, via communications module 101/301. The received representation of the one or more haptic properties of the skin of the other user pertains to one or more haptic properties of the skin of the other user which are measured 404 by haptic glove 150 and transmitted 407 to haptic glove 100.

Haptic glove 100 is further operative to detect 409 contact between haptic glove 100 and haptic glove 150, or any other haptic garment, using contact sensor 311, and in response thereto to render 410 the received representation of the one or more haptic properties of the skin of the other user within an area of contact between haptic glove 100 and haptic glove 150, using haptic actuator 322.

Figure 2:
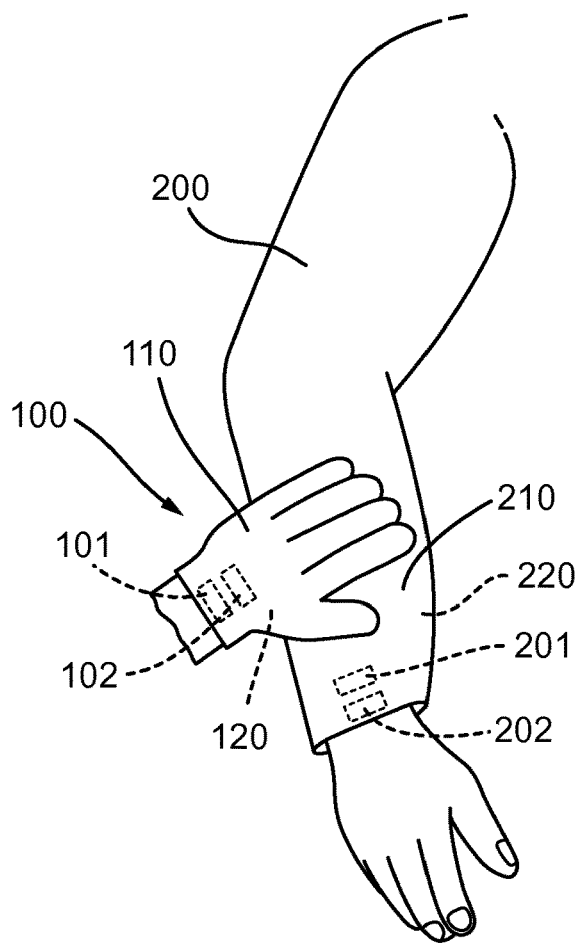
FIG. 2 illustrates a haptic glove and a sleeve of a haptic garment, in accordance with embodiments of the invention.

That is, when two haptic garments come into contact with each other, e.g., because the users wearing haptic gloves 100 and 150 shake hands, as is illustrated in FIG. 1, or because a user wearing haptic glove 100 touches a body part of another user, which body part is covered by a haptic garment, such as a sleeve 200 of a haptic garment illustrated in FIG. 2, a representation of the measured haptic properties of the skin of each of the users is transmitted to the other user, where it is rendered within areas of contact between the two haptic garments. In this way, each user experiences a sensation of touching the other user's skin as if none of them was wearing a garment.

In the present context, a representation of one or more haptic properties comprises one or more values representing one or more measured haptic properties. These values may be transmitted using any suitable protocol, e.g., the HyperText Transfer Protocol (HTTP), the Constrained Application Protocol (CoAP), or a similar protocol. Furthermore, a representation of the one or more haptic properties of the skin of a user may represent the respective measured haptic properties at a measured spatial resolution of haptic sensor 321, or at a reduced spatial resolution. Likewise, the resolution of a measured quantity, such as temperature, may be reduced after measuring and before rendering.

In order to render the one or more haptic properties which haptic glove 100 has received from haptic glove 150, or any other haptic garment which haptic glove 100 is in contact with, at a certain spatial resolution which reflects a spatial variation in the one or more measured haptic properties of the skin of the other user, the haptic properties which are measured at a certain location, or locations, of the skin of the other user need to be rendered at a corresponding location, or corresponding locations, of the skin of the user. For instance, with reference to FIG. 1, a haptic property measured at the index finger, close to the palm, of the hand of the other user wearing haptic glove 150 (marked by 161 in FIG. 1) needs to be rendered to the skin of the hand of the user wearing haptic glove 100 at the palm, close to the small finger. Likewise, a haptic property measured at the palm, close to the wrist, of the hand of the other user wearing haptic glove 150 (marked by 162 in FIG. 1) needs to be rendered to the skin of the hand of the user wearing haptic glove 100 at the index finger.

This may, e.g., be achieved by assigning a local coordinate system to each haptic garment, such as haptic gloves 100 and 150, and establishing a mapping, or transformation, between the local coordinate systems of haptic gloves 100 and 150 when in contact.

Figure 5:
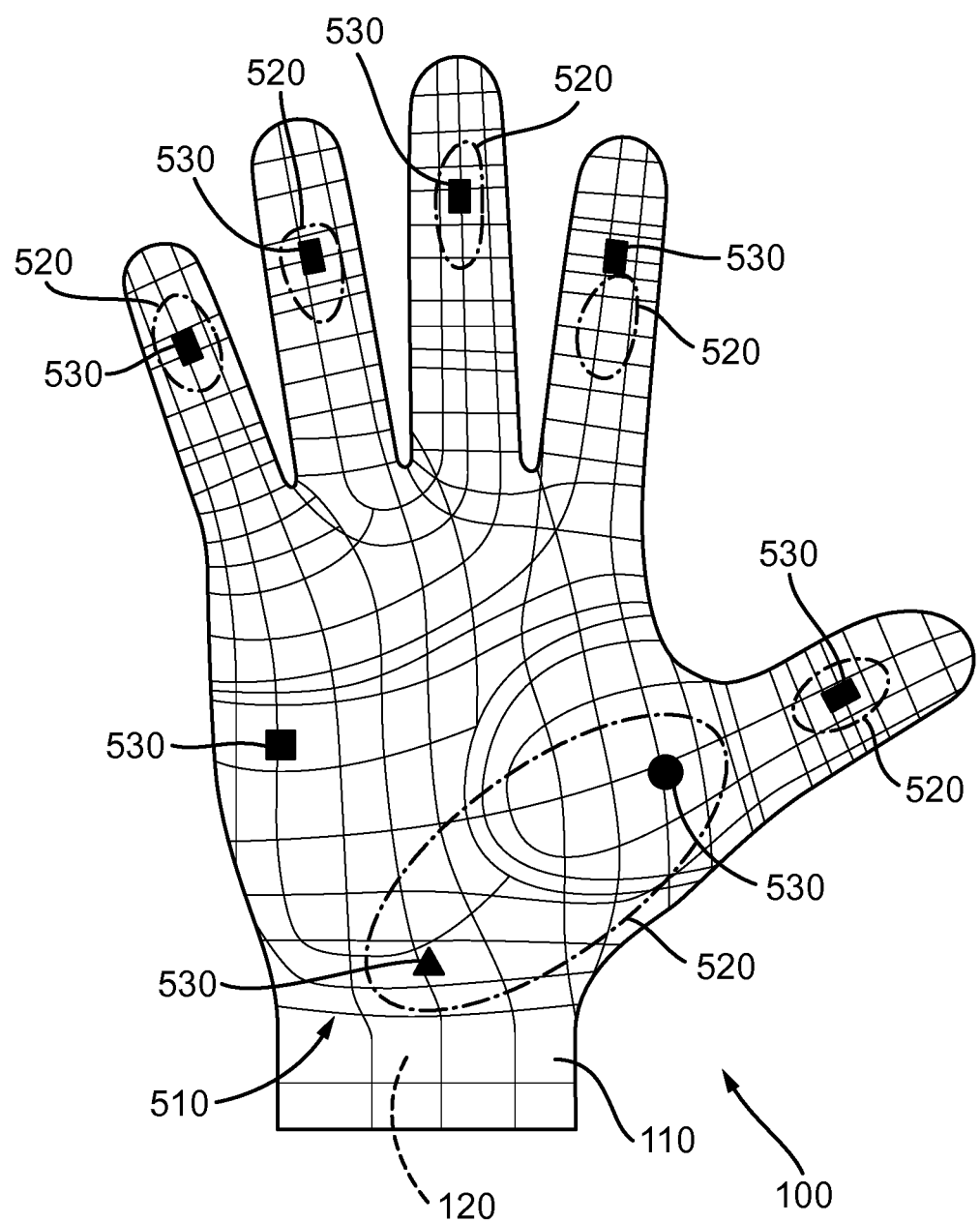
FIG. 5 shows a haptic glove, in accordance with further embodiments of the invention.

This is illustrated in FIG. 5, which shows haptic glove 100 and its local coordinate system 510, illustrated as a mesh. In FIG. 5, local coordinate system 510 is illustrated as covering the entire area of glove 100, or its inner surface 120. Alternatively, local coordinate system 510 may be assigned to those parts of glove 100, or inner surface 120, which are covered with haptic sensors 321 and haptic actuators 322.

A spatial relation between local coordinate system 510 of haptic glove 100, and a local coordinate system of another haptic garment which haptic glove 100 is in contact with, e.g., haptic glove 150, may, e.g., be derived based on one or more contact areas 520 which are detected by both haptic gloves 100 and 150. Since the pressure which is exerted on two haptic garments which are in contact is substantially equal, at a certain point, the respective contact areas 520 which are detected by haptic gloves 100 and 150 can be mapped to each other. In practice, contact areas 520 which are of similar size and shape are considered to correspond to each other. Based on the mapped contact areas 520, a transformation of the two local coordinate systems can be derived, at least within each mapped contact area 520.

In order to improve the mapping of the contact areas 520 detected by haptic gloves 100 and 150, respectively, haptic glove 100 may be provided with protruding markers 530 on outer surface 110. Markers 530 may, e.g., be spikes, or other protruding elements with optionally different shapes. Based on the known shape of markers 530, the mapping of local coordinate systems 510 becomes more reliable.

Alternatively, makers 530 may also be based on a material carrying an electric charge which may be detected by capacitive contact sensors 311 comprised in the other haptic garment which haptic glove 100 is in contact with, e.g., haptic glove 150.

For the purpose of mapping contact areas 520 as detected by haptic gloves 100 and 150, respectively, information pertaining to local coordinate system 510, is preferably exchanged between haptic gloves 100 and 150. In addition, the representation of the one or more measured haptic properties of the skin of the user which is transmitted 406 to haptic glove 150 preferably comprises, for each measured haptic property, location information relative to local coordinate system 510 of haptic glove 100, and/or relative to local coordinate system 510 of haptic glove 150. Likewise, the representation of the one or more measured haptic properties of the skin of the other user which is received 407 from haptic glove 150 preferably comprises, for each received haptic property, location information relative to local coordinate system 510 of haptic glove 150, and/or relative to local coordinate system 510 of haptic glove 100.

Optionally, haptic glove 100 may further be operative to generate 405 the representation of the one or more haptic properties of the skin of the user, before the generated representation is transmitted 406 to haptic glove 150. The generated representation may, e.g., represent at least one of the one or more measured haptic properties of the skin of the user as an average value over at least part of the skin of the user. For instance, one or more of the measured haptic properties, such as temperature, may be transmitted 406 as an average value, averaged over the entire contact area between haptic gloves 100 and 150, or the entire body part covered by haptic sensors 321. This is advantageous in that the amount of data which needs to be transmitted from haptic glove 100 to haptic glove 150 is reduced, saving communications resources. In addition, the mapping of local coordinate systems, as described with reference to FIG. 5, is not required. It is noted that for some haptic properties, such as temperature, only little variation is expected within the contact area between haptic gloves 100 and 150. Accordingly, user experience is not negatively affected by transmitting average values. Also, users may wish to disguise certain haptic properties, or limit the range of values at which measured haptic properties are shared with users of other haptic garments. For instance, by limiting the generated 405 representation to a subset of pre-determined haptic properties, the user of haptic glove 100 may prevent that certain haptic properties of his or her skin are revealed. Likewise, by limiting one or more of the measured haptic properties in the generated 405 representation to pre-determined ranges, the user of haptic glove 100 may prevent that certain haptic properties of his or her skin are revealed.

The selection of haptic properties which are included in the generated 405 representation as average values or with limited range, and the selection of haptic properties which are included in the generated 405 representation may, e.g., be configured by the user of haptic glove 100, by a manufacturer of haptic glove 100, by a provider of a haptic software application, or app, which is executed by haptic glove 100, or by a provider of a haptic service which is accessed with haptic glove 100.

Optionally, and in correspondence with what is described hereinbefore, the representation of the one or more measured haptic properties of the skin of the other user which is received 407 by haptic glove 100 may represent at least one of the one or more measured haptic properties of the skin of the other user, as an average value over at least part of the skin of the other user, as being limited to one or more pre-determined haptic properties, and/or as being limited to one or more pre-determined ranges.

Optionally, and in correspondence with what is described hereinbefore, haptic glove 100 may further be operative to modify 408, i.e., change or adapt, the received 407 representation of the one or more haptic properties of the skin of the other user before rendering 410. Similar to what is described hereinbefore with reference to generating 405 the representation of the one or more haptic properties of the skin of the user of haptic glove 100 or receiving 407 the representation of the one or more haptic properties of the skin of the other user which is generated 405 by haptic glove 150, the modified 408 representation of the one or more haptic properties of the skin of the other user may represent at least one of the one or more measured haptic properties of the skin of the other user as an average value over at least part of the skin of the other user, as being limited to one or more pre-determined haptic properties, and/or as being limited to one or more pre-determined ranges. Advantageously, the user of haptic glove 100 may thereby limit rendering of the measured haptic properties of the other user, e.g., in order to avoid rendering haptic properties of a type, or to a level of detail, which he or she prefers not to sense.

Further with reference to FIG. 4, haptic glove 100 may optionally be operative to commence the exchange of information 406/407 about the one or more haptic properties between haptic glove 100 and haptic glove 150 in response to detecting 402 contact between haptic gloves 100 and 150 by contact sensor 311. As an alternative, haptic glove 100 may further be operative to commence the exchange of information 406/407 about the one or more haptic properties between the haptic garment and the other haptic garment in response to detecting 401 proximity of the other haptic garment, e.g., haptic glove 150. Proximity may, e.g., be detected 401 by utilizing wireless communications module 101/301. This may, e.g., be achieved by comparing a measured signal strength, which is indicative of a distance between two haptic garments communicating via wireless communications modules 101/301, to a threshold value. The exchange of information pertaining to measured haptic properties between haptic garments, i.e., transmitting 406 and/or receiving 407 representations of haptic properties, prior to the haptic garments coming into contact is advantageous in that rendering of the haptic properties of the skin of the other user can commence immediately after contact is detected 409.

Further optionally, haptic glove 100 may be operative to commence measuring 404 the one or more haptic properties of the skin of the user in response to detecting 402 contact between haptic glove 100 and haptic glove 150 by contact sensor 311. Alternatively, haptic glove 100 may be operative to commence measuring 404 the one or more haptic properties of the skin of the user in response to detecting 401 proximity of haptic glove 150, as is described hereinbefore.

Further optionally, haptic glove 100 may be operative to establish 403 communications with the haptic glove 150 in response to detecting 402 contact between haptic glove 100 and haptic glove 150 by contact sensor 311. Alternatively, haptic glove 100 may be operative to establish 403 communications with haptic glove 150 in response to detecting 401 proximity of haptic glove 150, as is described hereinbefore. Establishing 403 communications, i.e., preparing the exchange of information by setting up a communications channel, between two haptic garments is advantageous in that rendering of the haptic properties of the skin of the other user can commence immediately after contact is detected 409.

It will be appreciated that embodiments of the invention are not limited to haptic gloves 100 and 150 described hereinbefore. Rather, the invention may be embodied in any type of haptic garment, or haptic fabric, such as a haptic vest, a haptic jacket, and or haptic pants. For instance, an embodiment of the invention in the form of a haptic jacket, or any other type of garment with a sleeve 200, is illustrated in FIG. 2.

In the scenario depicted in FIG. 2, the user wearing haptic glove 100 comes into contact, i.e., touches, another user wearing a garment comprising haptic sleeve 200. Similar to haptic gloves 100 and 150, haptic sleeve 200 comprises at least one haptic sensor 321 (shown in FIG. 3A as being comprised in haptic garment 300, which is comprised in haptic sleeve 200) configured to measure one or more haptic properties of a skin of the user, at least one haptic actuator 322 (shown in FIG. 3A as being comprised in haptic garment 300) configured to render one or more haptic properties for sensing by the skin of the user, at least one contact sensor (shown in FIG. 3B as being comprised in haptic garment 300) configured to detect contact between haptic sleeve 200 and haptic glove 100, a communications module 201 (corresponding to communications module 301 comprised in haptic garment 300) configured to exchange information about one or more haptic properties between haptic sleeve 200 and haptic glove 100, and a processing means 201 (corresponding to processing means 302 comprised in haptic garment 300). Haptic sleeve 200 is operative to measure the one or more haptic properties of a skin of the user, transmit a representation of the one or more measured haptic properties of the skin of the user to haptic glove 100 via communications module 201/301, receive a representation of one or more haptic properties of a skin of the other user from haptic glove 100 via communications module 201/301, and in response to detecting contact between haptic sleeve 200 and haptic glove 100 by contact sensor 311, to render the received representation of the one or more haptic properties of the skin of the other user within an area of contact between haptic sleeve 200 and haptic glove 100 using haptic actuator 321. Haptic sleeve 200 may further be operative to perform additional or alternative operations in correspondence to what is described hereinbefore with reference to haptic gloves 100 and 150.

Whereas embodiments of the invention have hereinabove been described with reference to haptic garments which are worn by different users, such as haptic gloves 100 and 150 shown in FIG. 1, as well as haptic glove 100 and haptic sleeve 200 shown in FIG. 2, one may also envisage scenarios in which two haptic garments which come into physical contact are worn by the same user, covering two different body parts of the user. For instance, with reference to FIG. 2, the user may touch his/her arm, covered by haptic sleeve 200, with his/her own hand, covered by haptic glove 100.

In such scenarios, and similar to what is described hereinbefore, a haptic garment, such as glove 100 shown in FIG. 2, is configured to cover at least part of a first body part of a user, such as the user's hand. Haptic garment 100 comprises at least one haptic sensor 321 configured to measure one or more haptic properties of a skin of the first body part of the user, at least one haptic actuator 322 configured to render one or more haptic properties for sensing by the skin of the first body part of the user, at least one contact sensor 311 configured to detect contact between the haptic garment 100 and another haptic garment 200, the other haptic garment 200 covering at least part of a second body part of the user, such as sleeve 200 covering the user's arm, and a communications module 101 configured to exchange information about one or more haptic properties between the haptic garment and the other haptic garment. Haptic garment 100 is operative to measure 404 the one or more haptic properties of a skin of the first body part of the user using the at least one haptic sensor 321, transmit 406 a representation of the one or more measured haptic properties of the skin of the first body part of the user to the other haptic garment 200 via communications module 101, receive 407 a representation of one or more haptic properties of a skin of the second body part of the user from the other haptic garment 200 via communications module 101, and, in response to detecting 409 contact between the haptic garment and the other haptic garment by the at least one contact sensor 311, to render 410 the received representation of the one or more haptic properties of the skin of the second body part of the user within an area of contact 520 between the haptic garment 100 and the other haptic garment 200 using the at least one haptic actuator 322.

Even further, one may envisage embodiments of the haptic garment which covers different body parts of a user, and which is operative to measure one or more haptic properties of a skin of a first body part of the user using the at least one haptic sensor, and, in response to detecting contact between a first part of the haptic garment, covering the first body part, and a second part of the haptic garment, covering the second body part, by the at least one contact sensor, to render the measured one or more haptic properties of the skin of the first body part within an area of contact between the first part of the haptic garment and the second part of the haptic garment using the at least one haptic actuator. In such scenarios which involve only a single haptic garment, rather than two haptic garments which exchange representations of one or more measured haptic properties with each other, a representation of one or more haptic properties measured at a first part of the user's skin are rendered to a second part of the user's skin, by the same haptic garment.

In the following, embodiments of processing means 102/202/302 comprised in embodiments of the haptic garment, such as haptic gloves 100 and 150, or haptic sleeve 200, are described with reference to FIGS. 6 and 7. A first embodiment 600 of processing means 102/202/302 is shown in FIG. 6. Processing means 600 comprises a processing unit 602, such as a general-purpose processor, and a computer-readable storage medium 603, such as a Random-Access Memory (RAM), a Flash memory, or the like. In addition, processing means 600 comprises one or more interfaces 601 ("I/O" in FIG. 6) for controlling and/or receiving information from other components comprised in the haptic garment, such as communications module 101/201/301, haptic sensor 321, haptic actuator 322, and contact sensor 311. Memory 603 contains computer-executable instructions 604, i.e., a computer program or software, to cause the haptic garment to become operative to perform in accordance with embodiments of the invention as described herein, when computer-executable instructions 604 are executed on processing unit 602.

Figure 7:
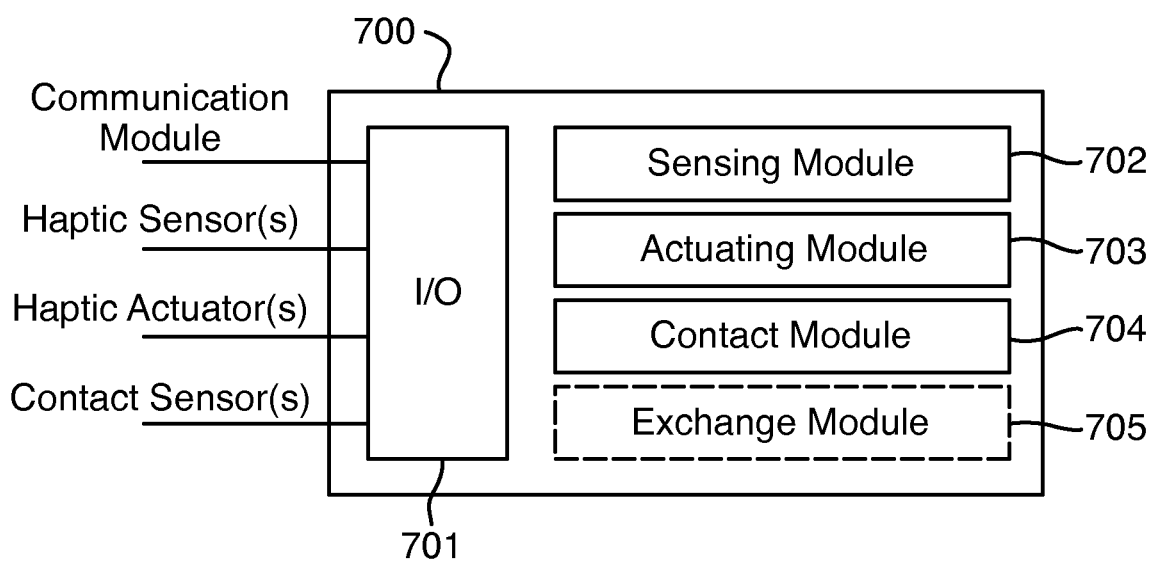
FIG. 7 shows further embodiments of the processing means comprised in the haptic garment.

An alternative embodiment 700 of processing means 102/202/302 is illustrated in FIG. 7. Similar to processing means 600, processing means 700 comprises one or more interfaces 701 ("I/O" in FIG. 7) for controlling and/or receiving information from other components comprised in the haptic garment, such as communications module 101/201/301, haptic sensor 321, haptic actuator 322, and contact sensor 311. Processing means 700 further comprises a sensing module 702, an actuating module 703, a contact module 704, a representation exchange module 705, which are configured to cause the haptic garment to perform in accordance with embodiments of the invention as described herein.

In particular, sensing module 702 is configured to measure the one or more haptic properties of a skin of the user using haptic sensor 321, and exchange module 705 is configured to transmit a representation of the one or more measured haptic properties of the skin of the user to the other haptic garment via communications module 101/201/301. Exchange module 705 is further configured to receive a representation of one or more haptic properties of a skin of the other user from the other haptic garment via communications module 101/201/301, and contact module 704 is configured to detect contact between the haptic garment and the other haptic garment by contact sensor 311. Actuating module 703 is configured to, in response to detecting contact by contact module 704, to render the received representation of the one or more haptic properties of the skin of the other user within an area of contact between the haptic garment and the other haptic garment using haptic actuator 322.

Optionally, sensing module 702 may further be configured to generate the representation of the one or more haptic properties of the skin of the user, wherein the generated representation represents at least one of the one or more haptic properties as at least one, or a combination, of an average value over at least part of the skin of the user, being limited to one or more pre-determined haptic properties, and being limited to one or more pre-determined ranges.

Optionally, actuating module 703 may further be configured to modify the received representation of the one or more haptic properties of the skin of the other user before rendering, wherein the modified representation of the one or more haptic properties of the skin of the other user represents at least one of the one or more haptic properties of the skin of the other user as at least one, or a combination, of an average value over at least part of the skin of the other user, being limited to one or more pre-determined haptic properties, and being limited to one or more pre-determined ranges.

Optionally, exchange module 705 may further be configured to commence the exchange of information about the one or more haptic properties between the haptic garment and the other haptic garment in response to detecting contact, by contact module 704 and contact sensor 311, between the haptic garment and the other haptic garment. Alternatively, exchange module 705 may be configured to commence the exchange of information about the one or more haptic properties between the haptic garment and the other haptic garment in response to detecting proximity of the other haptic garment.

Optionally, sensing module 702 may further be configured to commence the measuring of the one or more haptic properties of the skin of the user in response to detecting contact, by contact module 704 and contact sensor 311, between the haptic garment and the other haptic garment. Alternatively, sensing module 702 may be configured to commence the measuring of the one or more haptic properties of the skin of the user in response to detecting proximity of the other haptic garment.

Optionally, exchange module 705 may further be configured to establish communications with the other haptic garment, using communications module 101/201/301, in response to detecting contact, by contact module 704 and contact sensor 311, between the haptic garment and the other haptic garment. Alternatively, exchange module 705 may be configured to establish communications with the other haptic garment, using communications module 101/201/301, in response to detecting proximity of the other haptic garment.

Modules 701-705 comprised in processing mean 700 may further be configured to perform additional or alternative operations in accordance with embodiments of the invention, as described herein.

Interfaces 601 and 701, and modules 702-705, as well as any additional modules comprised in processing means 700, may be implemented by any kind of electronic circuitry, e.g., any one, or a combination of, analogue electronic circuitry, digital electronic circuitry, and processing means executing a suitable computer program, i.e., software.

Figure 8:
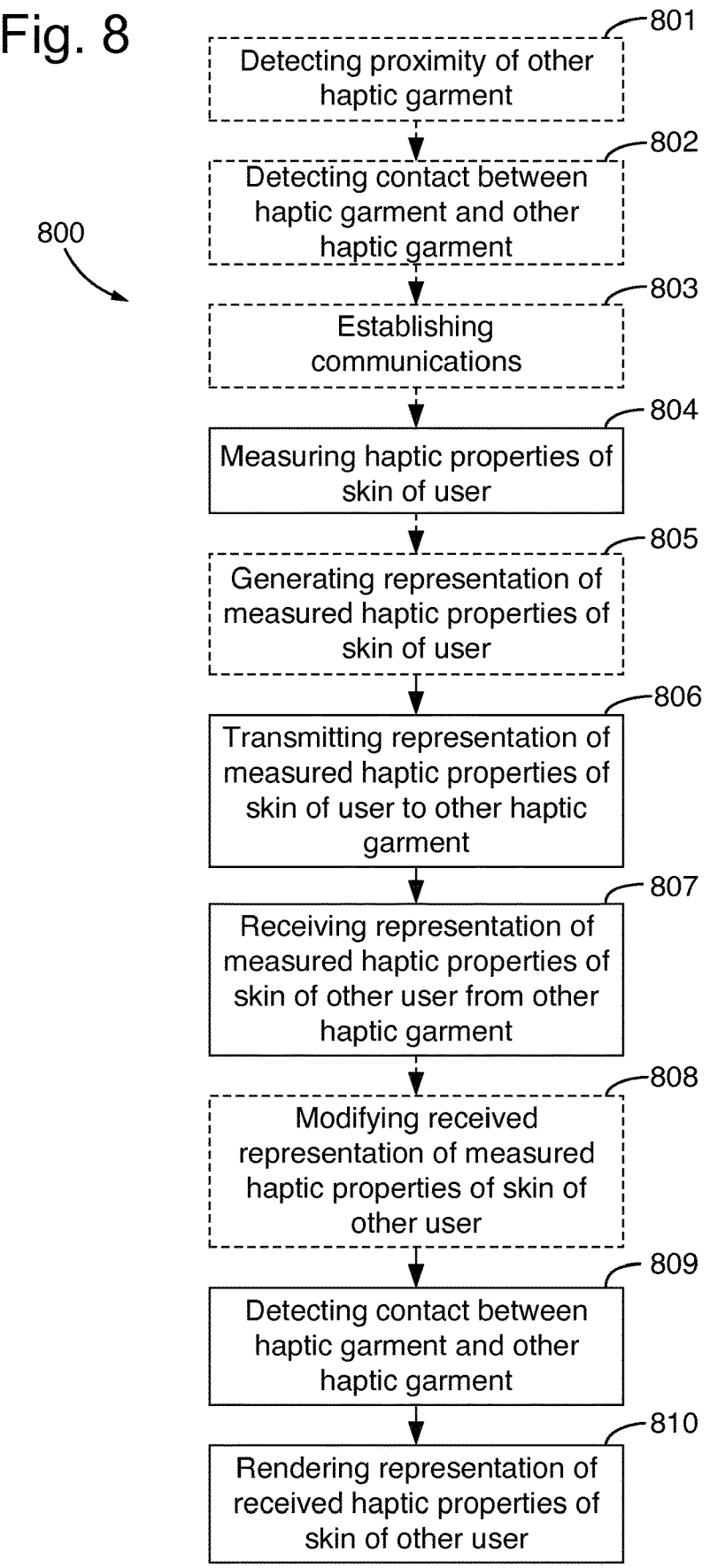
FIG. 8 illustrates a method performed by a haptic garment, in accordance with embodiments of the invention.

In the following, embodiments 800 of the method of performed by a haptic garment are described with reference to FIG. 8.

Method 800 comprises measuring 804 one or more haptic properties of a skin of the user using at least one haptic sensor comprised in the haptic garment, transmitting 806 a representation of the one or more measured haptic properties of the skin of the user to another haptic garment via a communications module comprised in the haptic garment, the other haptic garment covering at least part of a body part of another user, and receiving 807 a representation of one or more haptic properties of a skin of the other user from the other haptic garment via the communications module. Method 800 further comprises, in response to detecting 809 contact between the haptic garment and the other haptic garment by at least one contact sensor comprised in the haptic garment, rendering 810 the received representation of the one or more haptic properties of the skin of the other user within an area of contact between the haptic garment and the other haptic garment using at least one haptic actuator comprised in the haptic garment.

Optionally, method 800 may further comprise generating 805 the representation of the one or more haptic properties of the skin of the user, wherein the generated representation represents at least one of the one or more haptic properties as at least one, or a combination, of an average value over at least part of the skin of the user, as being limited to one or more pre-determined haptic properties, and as being limited to one or more pre-determined ranges.

Optionally, the received 807 presentation of the one or more haptic properties of the skin of the other user represents at least one of the one or more haptic properties of the skin of the other user as at least one, or a combination, of an average value over at least part of the skin of the other user, as being limited to one or more pre-determined haptic properties, and as being limited to one or more pre-determined ranges.

Optionally, method 800 further comprises modifying 808 the received representation of the one or more haptic properties of the skin of the other user before rendering, wherein the modified representation of the one or more haptic properties of the skin of the other user represents at least one of the one or more haptic properties of the skin of the other user as at least one, or a combination, of an average value over at least part of the skin of the other user, as being limited to one or more pre-determined haptic properties, and as being limited to one or more pre-determined ranges.

Optionally, method 800 further comprises commencing the exchange 806/807 of information about the one or more haptic properties between the haptic garment and the other haptic garment in response to detecting 802 contact between the haptic garment and the other haptic garment by the at least one contact sensor. Alternatively, method 800 may comprise commencing the exchange 806/807 of information about the one or more haptic properties between the haptic garment and the other haptic garment in response to detecting 801 proximity of the other haptic garment.

Optionally, method 800 may further comprise commencing the measuring 804 of the one or more haptic properties of the skin of the user in response to detecting 802 contact between the haptic garment and the other haptic garment by the at least one contact sensor. Alternatively, method 800 may comprise commencing the measuring 804 of the one or more haptic properties of the skin of the user in response to detecting 801 proximity of the other haptic garment.

Optionally, method 800 may further comprise establishing 803 communications with the other haptic garment in response to detecting contact between the haptic garment and the other haptic garment by the at least one contact sensor. Alternatively, method 800 may comprise establishing 803 communications with the other haptic garment in response to detecting 801 proximity of the other haptic garment.

It will be appreciated that method 800 may comprise additional, or modified, steps in accordance with what is described throughout this disclosure. An embodiment of method 800 may be implemented as software, such as computer program 604, to be executed by a processing unit comprised in a haptic garment, such as a haptic glove, a haptic vest, a haptic jacket, or haptic pants, whereby the haptic garment becomes operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. A haptic garment configured to cover at least part of a body part of a user, the haptic garment comprising:
   at least one haptic sensor configured to measure one or more haptic properties of a skin of the user,
   at least one haptic actuator configured to render one or more haptic properties for sensing by the skin of the user,
   at least one contact sensor configured to detect contact between the haptic garment and another haptic garment, the other haptic garment covering at least part of a body part of another user, and
   a communications module configured to exchange information about one or more haptic properties between the haptic garment and the other haptic garment,
   the haptic garment being operative to:
   measure the one or more haptic properties of the skin of the user using the at least one haptic sensor,
   transmit a representation of the one or more measured haptic properties of the skin of the user to the other haptic garment via the communications module,
   receive a representation of one or more haptic properties of a skin of the other user from the other haptic garment via the communications module, and
   in response to detecting contact between the haptic garment and the other haptic garment by the at least one contact sensor, to render the received representation of the one or more haptic properties of the skin of the other user within an area of contact between the haptic garment and the other haptic garment using the at least one haptic actuator.

2. The haptic garment according to claim 1, being further operative to generate the representation of the one or more haptic properties of the skin of the user, wherein the generated representation represents at least one of the one or more haptic properties of the skin of the user as at least one, or a combination, of:
   an average value over at least part of the skin of the user,
   limited to one or more pre-determined haptic properties, and
   limited to one or more pre-determined ranges.

3. The haptic garment according to claim 1, wherein the received presentation of the one or more haptic properties of the skin of the other user represents at least one of the one or more haptic properties of the skin of the other user as at least one, or a combination, of:
   an average value over at least part of the skin of the other user,
   limited to one or more pre-determined haptic properties, and
   limited to one or more pre-determined ranges.

4. The haptic garment according to claim 1, being further operative to modify the received representation of the one or more haptic properties of the skin of the other user before rendering, wherein the modified representation of the one or more haptic properties of the skin of the other user represents at least one of the one or more haptic properties of the skin of the other user as at least one, or a combination, of:
   an average value over at least part of the skin of the other user,
   limited to one or more pre-determined haptic properties, and
   limited to one or more pre-determined ranges.

5. The haptic garment according to claim 1, being further operative to commence the exchange of information about the one or more haptic properties between the haptic garment and the other haptic garment in response to detecting contact between the haptic garment and the other haptic garment by the at least one contact sensor.

6. The haptic garment according to claim 1, being further operative to commence the exchange of information about the one or more haptic properties between the haptic garment and the other haptic garment in response to detecting proximity of the other haptic garment.

7. The haptic garment according to claim 1, being further operative to commence the measuring of the one or more haptic properties of the skin of the user in response to detecting contact between the haptic garment and the other haptic garment by the at least one contact sensor.

8. The haptic garment according to claim 1, being further operative to commence the measuring of the one or more haptic properties of the skin of the user in response to detecting proximity of the other haptic garment.

9. The haptic garment according to claim 1, being further operative to establish communications with the other haptic garment in response to detecting contact between the haptic garment and the other haptic garment by the at least one contact sensor.

10. The haptic garment according to claim 1, being further operative to establish communications with the other haptic garment in response to detecting proximity of the other haptic garment.

11. The haptic garment according to claim 1, being any one of a haptic glove, a haptic vest, a haptic jacket, and haptic pants.

12. A method performed by a haptic garment covering at least part of a body part of a user, the method comprising:
    measuring one or more haptic properties of a skin of the user using at least one haptic sensor comprised in the haptic garment, transmitting a representation of the one or more measured haptic properties of the skin of the user to another haptic garment via a communications module comprised in the haptic garment, the other haptic garment covering at least part of a body part of another user, receiving a representation of one or more haptic properties of a skin of the other user from the other haptic garment via the communications module, and in response to detecting contact between the haptic garment and the other haptic garment by at least one contact sensor comprised in the haptic garment, rendering the received representation of the one or more haptic properties of the skin of the other user within an area of contact between the haptic garment and the other haptic garment using at least one haptic actuator comprised in the haptic garment.

13. The method according to claim 12, further comprising generating the representation of the one or more haptic properties of the skin of the user, wherein the generated representation represents at least one of the one or more haptic properties as at least one, or a combination, of:

an average value over at least part of the skin of the user, limited to one or more pre-determined haptic properties, and limited to one or more pre-determined ranges.

14. The method according to claim 12, wherein the received presentation of the one or more haptic properties of the skin of the other user represents at least one of the one or more haptic properties of the skin of the other user as at least one, or a combination, of:

an average value over at least part of the skin of the other user, limited to one or more pre-determined haptic properties, and limited to one or more pre-determined ranges.

15. The method garment according to claim 12, further comprising modifying the received representation of the one or more haptic properties of the skin of the other user before rendering, wherein the modified representation of the one or more haptic properties of the skin of the other user represents at least one of the one or more haptic properties of the skin of the other user as at least one, or a combination, of:

an average value over at least part of the skin of the other user, limited to one or more pre-determined haptic properties, and limited to one or more pre-determined ranges.

16. The method according to claim 12, further comprising commencing the exchange of information about the one or more haptic properties between the haptic garment and the other haptic garment in response to detecting contact between the haptic garment and the other haptic garment by the at least one contact sensor.

17. The method according to claim 12, further comprising commencing the exchange of information about the one or more haptic properties between the haptic garment and the other haptic garment in response to detecting proximity of the other haptic garment.

18. The method according to claim 12, further comprising commencing the measuring of the one or more haptic properties of the skin of the user in response to detecting contact between the haptic garment and the other haptic garment by the at least one contact sensor.

19. The method according to claim 12, further comprising commencing the measuring of the one or more haptic properties of the skin of the user in response to detecting proximity of the other haptic garment.

20. The method according to claim 12, further comprising establishing communications with the other haptic garment in response to detecting contact between the haptic garment and the other haptic garment by the at least one contact sensor.

21. The method according to claim 12, further comprising establishing communications with the other haptic garment in response to detecting proximity of the other haptic garment.

22. The method according to claim 12, being performed by any one of a haptic glove, a haptic vest, a haptic jacket, and haptic pants.

23. A computer program product comprising a non-transitory computer readable storage medium storing computer-executable instructions for causing a haptic garment to perform the method according to claim 12, when the computer-executable instructions are executed on a processing unit comprised in the haptic garment.

* * * * *